Patented Feb. 7, 1928.

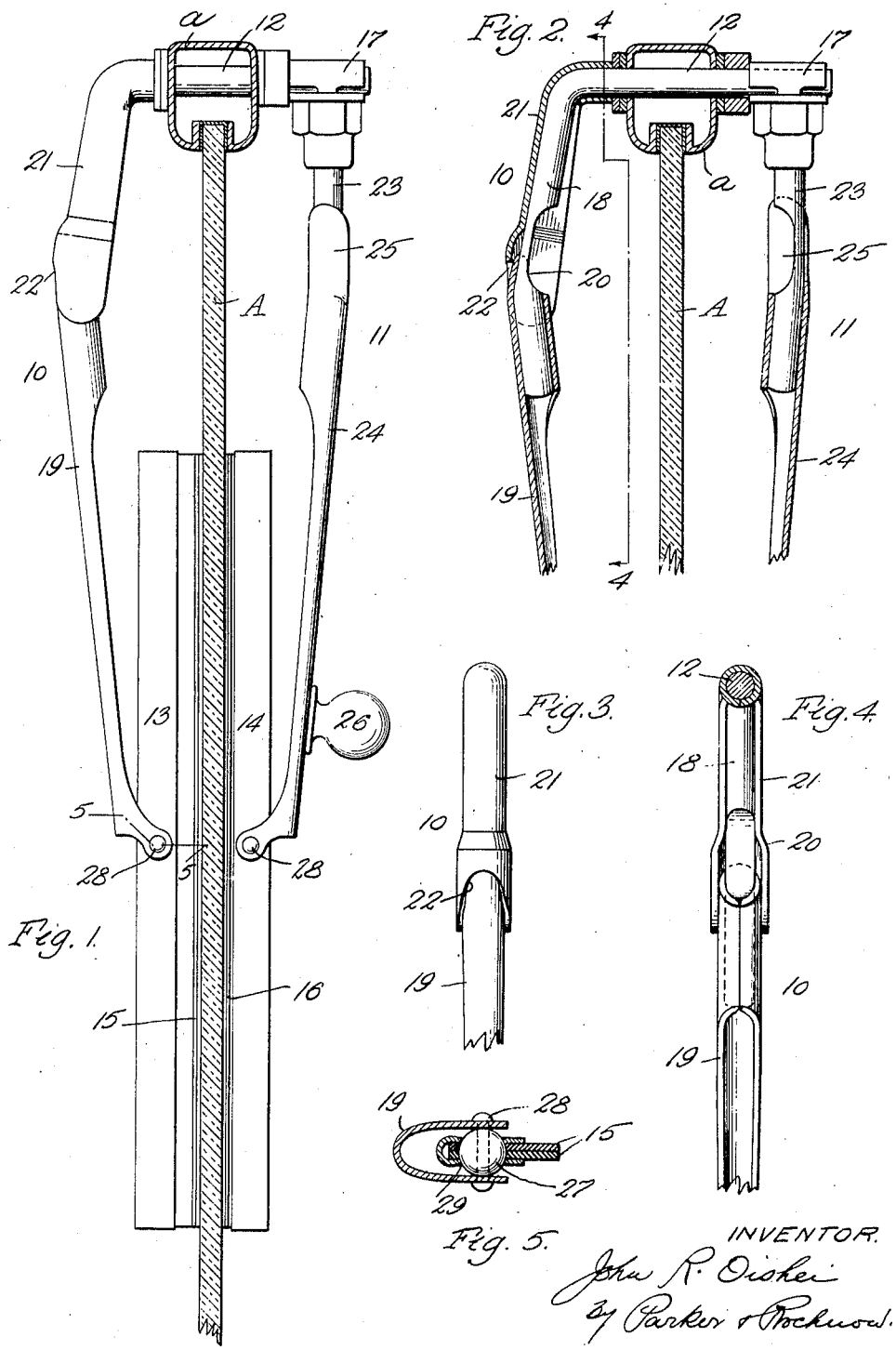

1,658,389

UNITED STATES PATENT OFFICE.

JOHN R. OISHEI, OF BUFFALO, NEW YORK, ASSIGNOR TO TRICO PRODUCTS CORPORATION, OF BUFFALO, NEW YORK.

CLEANER FOR WINDSHIELDS AND THE LIKE.

Application filed July 26, 1921. Serial No. 487,599.

This invention relates more particularly to improvements in cleaners of the kind which are pivotally mounted on the windshields of automobiles so that the cleaner can be swung in an arc over the face of the windshield glass for cleaning or wiping the same so as to enable a clear view through the glass. The cleaner is not, however, restricted to use on automobile windshields, but is adapted for use also on windows or analogous structures. Swinging cleaners of this sort usually comprise arms or members at opposite sides of the windshield or window and connected by a pivotally mounted shaft, the arm at the front side carrying a wiper for the glass, and the other arm or member serving as an actuating handle for swinging the cleaner. In some cleaners the inner arm or member also carries a wiper for the inner face of the glass. These cleaners are pivotally mounted on the windshields in various ways, for instance, by journalling the pivot shaft in a bearing hole passing through the frame of the windshield or in a clamp or securing device which is adapted to be detachably secured at the required point on the frame of the windshield.

The objects of this invention are to provide a practicable and desirable windshield or window cleaner, which will be sturdy and durable, but which is of simple, inexpensive and attractive construction and is composed of the minimum number of parts and has the minimum of joints which can wear or become loose and rattle or be noisy in use; also to connect the wiper with its carrying arm by a joint of inexpensive and simple construction which permits the wiper to tilt on the carrying arm in two directions perpendicular to the windshield glass to cause the wiper to bear uniformly from end to end on the glass and tilt sidewise in one direction or the other as the wiper is swung back and forth over the glass, and in a third direction so that the wiper can assume a position at an angle to its carrying arm and lie parallel with and flat against the frame of the windshield when the cleaner is not in use and is swung up out of the way at the top of the windshield; and also to improve the construction of windshield cleaners in the other respects hereinafter described and set forth in the claims.

In the accompanying drawings:

Fig. 1 is a side elevation of a windshield cleaner embodying the invention, and having wipers for both faces of the windshield, a portion of which is shown in section.

Fig. 2 is a fragmentary view thereof showing the windshield cleaner in sectional elevation.

Fig. 3 is a fragmentary front elevation of the wiper-carrying arm.

Fig. 4 is a sectional elevation of the cleaner on line 4—4, Fig. 2.

Fig. 5 is a sectional plan view thereof, enlarged, on lines 5—5, Fig. 1.

A represents the upper portion of a windshield for automobiles and $a$ the top frame bar thereof.

Figure 6:
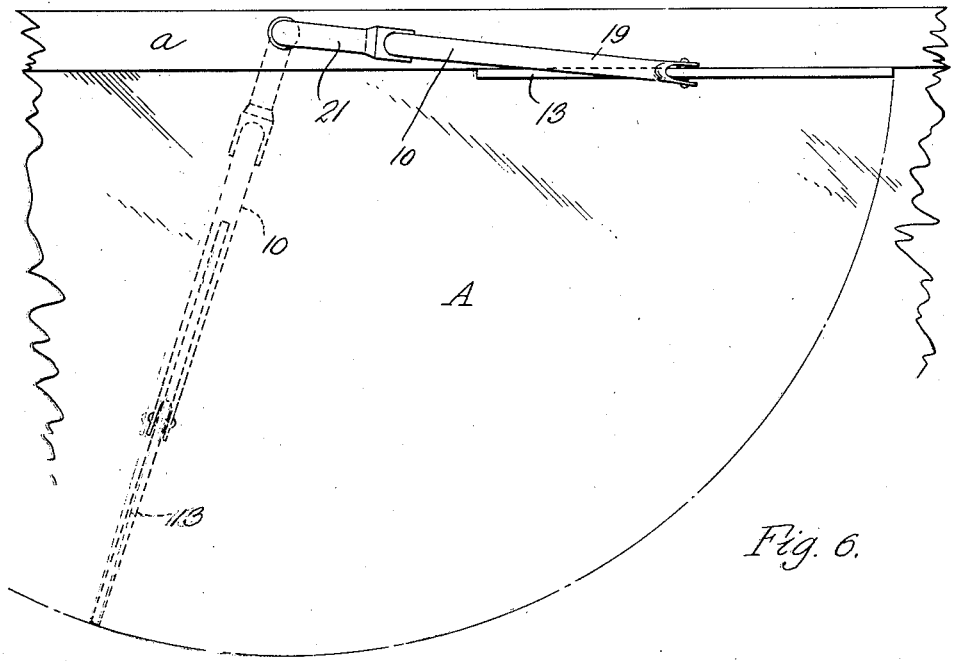
Fig. 6 is a front elevation of the upper portion of the windshield and the cleaner, showing by full and broken lines different positions of the cleaner.

As shown in Figs. 1-6, the windshield cleaner comprises two wiper carrying arms 10 and 11 which are disposed at opposite sides of the windshield and are connected by a pivot or rock shaft 12 extending transversely of the windshield, and wipers 13 and 14, each of which is mounted between its ends on one of the carrying arms and is adapted to contact with the adjacent face of the windshield glass. The wipers may be of any usual or suitable construction, the wiper 13 shown consisting, as usual of a folded metal strip holding or clamping one or more strips 15 of rubber or other suitable material adapted to clear the glass of rain, snow or other accumulations. The other wiper 14 is of similar construction except that a strip 16 of felt or other material suitable for wiping the inner face of the glass is used instead of a rubber strip or strips. As shown in Figs. 1, 2 and 6, the pivot shaft 12 extends through and is journalled in a bearing hole in the top frame bar $a$ of the windshield, the wiper-carrying arm 10 at the front side of the windshield being rigidly and permanently connected to the outer end of the shaft while the wiper-carrying arm 11 at the rear side of the windshield is detachably secured to the inner end of the shaft 12 by a clamp 17 which may be of any suitable construction. This detachable connection between the shaft and the rear arm permits the disconnection of the parts so that the shaft can be passed through the bearing hole in the windshield frame.

The wiper carrying arm 10 at the front side of the windshield preferably comprises an inner section formed by a laterally bent, integral extension 18 of the outer end of the pivot shaft 12, and an outer section 19 which is formed of a piece of sheet metal bent into channel shape in cross section and is rigidly secured to the end of the inner section 18. The inner end of the outer section 19 is preferably tubular and sleeved on the end of the part 18 to which it is permanently secured by welding, or in any other suitable way. The inner section 18 of the arm 10 is reduced or cut away, preferably at the inner side thereof forming a defined resilient portion, as shown at 20, and the part 18 is made of spring temper so that the arm is resilient and adapted to flex at this reduced portion, which thus constitutes a spring for yieldably pressing the wiper 13 into proper wiping contact with the front face of the glass. The reduced portion of the section 18 is preferably thin in a direction perpendicular to the windshield, but is relatively wide laterally, so that while it can flex toward and from the windshield, it is substantially rigid laterally and is not apt to flex or be deflected sideways. Preferably, the inner section 18 of the arm 10 is bent between its ends at or adjacent to the reduced portion 20 so that the arm extends inwardly toward the windshield at opposite sides of the bend. This formation provides the necessary clearance for the wiper 13 between the windshield glass and the carrying arm, but nevertheless permits the shaft end of the arm to be located close to the frame bar of the windshield, which is desirable or necessary in some automobiles to prevent the cleaner from striking the top of the automobile when the windshield is swung out of vertical position. The inner portion of the section 18 is preferably covered by a sheet metal cover piece 21, which is permanently secured to the section 18 and extends along the same from its junction with the shaft 12 and overlaps the inner end of the outer section 19 of the arm so as to cover the inner end of this part and the reduced spring portion of the rod 18. The outer end of this cover piece 21 is cut out at 22 so as not to interfere with the flexing or resilient action of the arm 10, but the side portions of the cover piece straddle and bear against the opposite sides of the section 19 of the arm. This cover piece, while thus not interfering with the free flexing or springing of the outer part of the arm toward and from the windshield, braces the arm laterally at its reduced, resilient portion, and prevents lateral deflection or bending of the arm. Since the reduced part of the section 18 is relatively stiff sideways, and is braced laterally by the cover piece, the arm is very rigid in a lateral direction and is not apt to deflect or spring laterally when swinging the cleaner to wipe the glass. The cover piece 21 preferably extends a short distance on the pivot shaft portion 12, whereby its upper end edge provides a stop or bearing member adapted to cooperate with the frame bar of the windshield or the wiper-carrying clamp to aid in properly positioning and maintaining the wiper on the windshield.

The other wiper-carrying arm 11, like the arm 10, preferably comprises an inner rod section 23 and an outer channel-shaped, sheet metal section 24, which is sleeved on and permanently secured by welding or otherwise to the outer end of the rod section 23. The rod section 23 is cut away or reduced as in the case of the rod 18 to make the arm resilient and provide the necessary spring for holding the inner wiper yieldingly against the glass. Preferably, the inner end of the channel-shaped section 24 has side extensions 25 which project at opposite sides of the rod 23 beyond the reduced or cut away portion 22 thereof so as to cover or hide this reduced portion and stiffen the arm laterally while not interfering with its flexing action toward and from the windshield glass. A knob 26 is preferably secured on the arm 11 to serve as a handle for swinging the cleaner. As shown, the shaft 12 is held from endwise movement in its bearing by engagement of the cover piece on the arm 10 and the clamp for the arm 11 with the opposite ends of the bearing or with washers or spacers interposed between said parts and the bearing. The springs of the arms therefore cannot shift the shaft in its bearing and defeat the action of the springs.

Each of the wipers 13 and 14 is preferably pivotally mounted on the outer end of its carrying arm by a ball and socket joint constructed as shown in Fig. 5, to swing universally including swinging in the plane of the flexing of the upper section of the wiper carrying arm. This joint consists of a steel ball 27 which is secured between the channel flanges of the outer arm section by a rivet 28 passing through the ball and through the flanges, and fits loosely in a socket or hole 29 in the folded metal strip of the wiper. The wiper is thus adapted to swing universally to a limited extent on the ball 27 between the flanges of the carrying arm. The wiper can tilt on the arm in the longitudinal plane of the wiper perpendicularly to the windshield so that the wiper will bear uniformly from end to end against the glass. The wiper is also adapted to tilt perpendicularly to this longitudinal plane so that it will assume opposite oblique positions and trail over the face of the glass in swinging the cleaner back and forth to wipe the glass. In addition to these two movements, the wiper can also swing to a position at an inclination to the plane of the carrying arm so that it is adapted to rest flat against the inner edge of the frame of the windshield as shown in Fig. 6, when the cleaner is not being used and is swung up out of the way to the position shown in said figure. This ball joint, while thus permitting the described universal movement of the wiper on its carrying arm, nevertheless prevents undue looseness of the wiper, so that it can not rattle and will not be objectionably loose.

Figure 7:
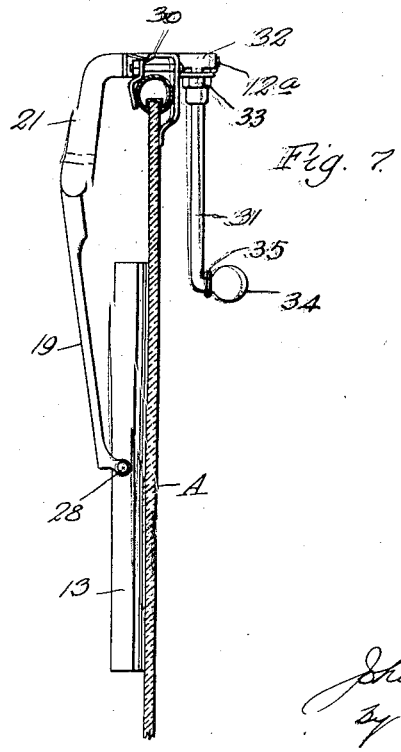
Fig. 7 is a transverse sectional elevation on a reduced scale, showing a windshield cleaner of similar construction but having only one wiper, and being differently mounted on the windshield.

The cleaner shown in Fig. 7 has only one wiper, that for the outer or front face of the windshield. The carrying arm for this wiper is constructed like the outer carrying arm in the cleaner above described and the wiper is pivotally connected to the arm as described. This cleaner, however, is shown as being pivotally mounted on the windshield by journalling its shaft 12ª in a suitable clamp 30 adapted to be detachably secured to the frame bar of the windshield. The detachable clamp obviates the necessity for drilling a bearing hole in the windshield frame. This clamp can be of the construction shown and described in my application for patent, Serial No. 425,672, filed Nov. 22, 1920, or of any other suitable construction. This cleaner instead of having a wiper and wiper-carrying arm at the rear or inner side of the windshield, is simply provided with an actuating arm 31 which is secured to the inner end of the shaft by a fastening device and the actuating arm is provided at its free end with a suitable knob or handle adapted to be grasped for actuating the cleaner. As shown, actuating arm 31 is preferably rigid and provided with a portion 32 which extends over shaft 12ª for which purpose the portion 32 is provided with a suitable aperture through which a part of shaft 12ª projects and the arm is secured on the shaft by means of a nut 33. The nut 33 is preferably in threaded engagement with a portion of arm 31 and when screwed up on arm 31 engages a portion of shaft 12ª and securely clamps the shaft in the arm. At its lower end arm 31 is preferably bent outwardly and is provided with a suitable knob or handle. In the embodiment shown, the lower end of arm 31 which is bent outwardly projects into a knob 34 which is substantially spherical in form and provided with a collar 35. By reason of the shape of this knob and its collar 35 the knob may be firmly grasped by the operator and a substantial projecting handle provided which facilitates easy operation of the cleaner. The detachable connection for the arm 31 with the shaft permits easy assembly of the device on a windshield and ready adjustment to windshields of different thicknesses. In this form, as shown, the arm 31 is preferably spaced from the windshield glass and by reason of the substantially rigid character of the arm when used in connection with a yielding wiper-carrying arm, prompt and positive actuation of the wiper strip is assured when the actuating arm is moved.

It should be understood that either of the two cleaners shown can be journalled in a bearing hole passing through the windshield as shown in Figs. 1, 2 and 6, or mounted on the windshield by means of a detachable clamp as indicated in Fig. 7, and in so far as the improved construction of the cleaner herein claimed is concerned, it can be pivotally mounted on the windshield in any other suitable way.

Uniform travel of the inside and outside wipers is insured, due to the rigid construction of the outer sections of the carrying arms to the inner sections thereof, and also to the elimination of all joints which prevent loose connections and irregularity in assembling.

I claim as my invention:

1. In a cleaner for windshields and the like, the combination of an oscillatory shaft mounted to extend transversely of a windshield, a wiper-carrying arm and an actuating member at opposite sides of the windshield and connected by said shaft, said wiper-carrying arm comprising an inner section formed by a bent extension of said shaft and an outer section rigid with said inner section, said inner section having a reduced resilient portion adapted to flex toward the windshield, and a wiper carried by said outer arm section and pressed yieldingly toward the windshield by said resilient portion of the carrying arm.

2. In a cleaner for windshields and the like, the combination of a pivot shaft mounted to oscillate on and extending transversely of a windshield, a wiper-carrying arm and an actuating member at opposite sides of the windshield connected by said shaft, said wiper-carrying arm comprising an inner section formed by an integral bent extension of said shaft and an outer section which receives and is rigidly secured on the outer end of said inner section, said inner section having a reduced resilient portion adapted to flex toward and from the windshield, a cover piece secured on said inner section and having parts which overlap the inner end of said outer section and brace the same against lateral deflection while not interfering with the movement of the outer section toward the windshield, and a wiper which is carried by said outer section and is pressed toward the windshield by said resilient portion of the carrying arm.

3. In a cleaner for windshields and the like, the combination of a pivot shaft mounted to oscillate on and extending transversely of a windshield, a wiper-carrying arm and an actuating member at opposite sides of the windshield connected by said shaft, said wiper-carrying arm comprising an inner section formed by an integral bent extension of said shaft and a channel-shaped sheet metal outer section which receives and is rigidly secured on the outer end of said inner section, said inner section having between said shaft and the inner end of said outer section a reduced integral resilient portion adapted to flex towards and from the windshield, and a wiper which is pivoted between the flanges of said outer section and pressed yieldingly towards the windshield by said resilient portion of the carrying arm.

4. In a cleaner for windshields and the like, the combination of a pivot shaft mounted to oscillate on and extending transversely of a windshield, a wiper-carrying arm and an actuating member at opposite sides of the windshield connected by said shaft, said wiper-carrying arm comprising an inner section formed by an integral bent extension of said shaft and a separate outer section rigidly secured to the outer end of said inner section, said inner section having a flattened resilient portion with the flattened side adjacent the windshield and adapted to flex toward and from the windshield but is relatively rigid laterally, and a wiper which is carried by said outer section and is pressed yieldingly toward the windshield by said resilient portion of the carrying arm.

5. In a cleaner for windshields and the like, the combination of a pivot shaft mounted to oscillate on and extending transversely of a windshield, a wiper-carrying arm and an actuating member at opposite sides of the windshield connected by said shaft, said wiper-carrying arm comprising an integral bent extension of said shaft, said extension having a flattened resilient portion with the flattened side adjacent the windshield and adapted to flex toward and from the windshield but is relatively rigid laterally, and a part extending across said flattened resilient portion and engaging said wiper-carrying arm at opposite sides of said reduced portion for bracing said wiper carrying arm laterally, and a wiper which is carried by said arm and is pressed yieldingly towards the windshield by said resilient portion of the carrying arm.

6. In a windshield cleaner, the combination of a pivot shaft mounted to oscillate on and extend transversely of a windshield, a wiper-carrying arm comprising upper and lower sections connected by a reduced resilient portion adapted to flex toward the windshield glass, and a part extending across said resilient portion and engaging said lower section whereby said wiper-carrying arm is braced laterally, and a wiper carried by said arm and pressed yieldingly toward the windshield glass by said resilient portion of the carrying arm.

7. In a cleaner for windshields and the like, the combination of an oscillatory wiper-carrying arm having a bifurcated outer portion, a ball secured in said bifurcated portion, and a wiper located in said bifurcated portion in spaced relation thereto and having a socket in which said ball is loosely seated whereby said wiper has a limited universal movement on said ball.

8. In a cleaner for windshields and the like, the combination of an oscillatory wiper-carrying arm having a bifurcated outer portion, a ball secured in said bifurcated portion by a rivet passing through the ball and the members of said bifurcated portion, and a wiper located in said bifurcated portion in spaced relation thereto and having a hole therethrough in which said ball is loosely seated whereby said wiper has a limited universal movement on said ball.

9. In a cleaner for windshields and the like, the combination of a pivot shaft mounted to oscillate on and extend transversely of a windshield frame, a wiper-carrying arm and an actuating member at opposite sides of the windshield connected by said shaft, said wiper-carrying arm comprising an inner section formed by an integral bent extension of said shaft, and an outer section rigid with said inner section, a cover piece secured on said inner section and having parts which overlap the inner end of said outer section and brace the same against lateral deflection while not interfering with the movement of the outer section toward the windshield, the upper end of said cover piece extending a distance along said pivot shaft and providing a stop to aid in positioning and maintaining said cleaner on the windshield, and a wiper which is carried by said outer section and is pressed toward the windshield by said carrying arm.

10. In a windshield cleaner, the combination of a shaft mounted to extend transversely of a windshield, a wiper-carrying arm and an operating member at opposite sides of the windshield and connected by said shaft, said wiper-carrying arm comprising rigid upper and lower sections connected by a reduced resilient portion adapted to flex toward the windshield glass, and side flanges on said upper section extending along said reduced resilient portion and engaging the sides of said lower section, whereby said wiper-carrying arm is braced laterally, and a wiper carried by said lower section and pressed yieldingly toward the windshield glass by said resilient portion of the carrying arm.

11. In a device of the character set forth, the combination with a shaft arranged transversely of the plane of a transparent medium, of an arm depending from said shaft, and a squeegee having universal connection through a ball and socket joint with said arm.

12. In a device of the character set forth, the combination with a shaft arranged transversely of the plane of a transparent medium, of an arm depending from said shaft and provided with a squeegee receiving portion in the nature of a socket, and a squeegee having a substantially spherical part mounted in said receiving portion, whereby the squeegee is capable of universal movement with respect to the arm.

13. In a windshield cleaner, the combination of a wiper having a transverse opening, a ball retained within said opening, the opposed portions of which ball protrude on opposite sides of the wiper, a wiper carrying arm having opposed jaws with portions cooperating with the protruding portions of the ball, means pivotally supporting the arm in operative relation to a windshield, and means for swinging the arm thereby to sweep the wiper across the windshield.

14. In a windshield cleaner, the combination of a wiper having a spherical part the opposed portions of which part protrude on opposite sides of the wiper, a wiper carrying arm having opposed jaws disposed on opposite sides of the wiper for engagement with the said spherical part, the wiper and jaws cooperating to restrain the wiper against undue pivotal movement with respect to the arm, means pivotally supporting the arm in operative relation to a windshield, and means for swinging the arm thereby to sweep the wiper across the windshield.

15. In a windshield cleaner, the combination of a wiper having a transverse opening, a ball retained within said opening, said ball having a transverse bore, a wiper carrying arm having opposed jaws disposed on opposite sides of the wiper for engagement with the ball, a pin extending therethrough and having its ends engage with the jaws to restrain them against separation, means pivotally supporting the arm in operative relation to a windshield, and means for swinging the arm thereby to sweep the wiper across the windshield.

JOHN R. OISHEI.